UNITED STATES PATENT OFFICE.

JOHN MARION STUKES, OF SNYDER, TEXAS, ASSIGNOR TO JOHN S. WINFIELD, OF GATESVILLE, TEXAS.

EGG-PRESERVING COMPOUND.

SPECIFICATION forming part of Letters Patent No. 694,899, dated March 4, 1902.

Application filed June 25, 1901. Serial No. 66,000. (No specimens.)

*To all whom it may concern:*

Be it known that I, JOHN MARION STUKES, a citizen of the United States, residing at Snyder, in the county of Scurry and State of Texas, have invented a new and useful Egg-Preserving Compound, of which the following is a specification.

This invention relates to compositions of matter, and has for its object to provide an improved compound for application to the shells of eggs to fill up the pores thereof and exclude air from gaining access to the interior of the egg, thereby to preserve the same without affecting the taste or quality of the egg and obviating the necessity of placing eggs thus treated in cold storage.

In carrying out the invention I employ the following ingredients: refined cotton-seed oil, one gallon; beeswax, two pounds; paraffin-wax, two pounds; salicylic acid, one-half ounce. The beeswax and paraffin-wax are melted in the oil over a slow fire, and when the waxes have been thoroughly melted the liquid is removed from the fire, and when partly cooled the salicylic acid is stirred into the liquid, which is then permitted to cool, the resultant compound having the consistency of grease or butter and of a golden-yellow color.

In using the preservative compound it is rubbed or otherwise applied to the exterior of the shell of an egg, thereby entering the pores and closing the same against the entrance of air into the egg, whereby the egg is preserved in its normal condition for a long period without being placed in cold storage and without losing its flavor nor any of its properties.

What is claimed is—

The herein-described egg-preserving compound consisting of; cotton-seed oil, one gallon; beeswax, two pounds; paraffin-wax, two pounds, and salicylic acid, one-half ounce.

In testimony that I claim the foregoing as my own I have hereto affixed my signature in the presence of two witnesses.

JOHN MARION STUKES.

Witnesses:
H. M. SUTTON,
WALTER L. STEELE.